US012625963B2

(12) United States Patent
Chen et al.

(10) Patent No.: US 12,625,963 B2
(45) Date of Patent: May 12, 2026

(54) OVER-THE-AIR DEVICE, OVER-THE-AIR METHOD AND OVER-THE-AIR SYSTEM

(71) Applicant: Nuvoton Technology Corporation, Hsinchu Science Park (TW)

(72) Inventors: Ching-An Chen, Taoyuan City (TW); Tzu-Lan Shen, Taoyuan City (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 293 days.

(21) Appl. No.: 18/347,176

(22) Filed: Jul. 5, 2023

(65) Prior Publication Data

US 2024/0070278 A1      Feb. 29, 2024

(30) Foreign Application Priority Data

Aug. 26, 2022    (TW) ................................. 111132224

(51) Int. Cl.
| | |
|---|---|
| *G06F 21/57* | (2013.01) |
| *G06F 21/44* | (2013.01) |
| *H04L 67/12* | (2022.01) |

(52) U.S. Cl.
CPC .............. *G06F 21/57* (2013.01); *G06F 21/44* (2013.01); *H04L 67/12* (2013.01)

(58) Field of Classification Search
CPC ........... G06F 21/57; G06F 21/44; H04L 67/12
USPC ........................................................ 726/26
See application file for complete search history.

(56) References Cited

U.S. PATENT DOCUMENTS

| | | | | |
|---|---|---|---|---|
| 5,757,795 | A | 5/1998 | Schnell | |
| 10,313,127 | B1 * | 6/2019 | Flach | .................. G06F 21/6245 |
| 2016/0378401 | A1 * | 12/2016 | Savic | .................... G06F 3/0608 |
| | | | | 710/74 |
| 2022/0342660 | A1 * | 10/2022 | Abe | ......................... G06F 21/57 |
| 2023/0254374 | A1 * | 8/2023 | Harata | ................... G07C 5/008 |
| | | | | 711/154 |

OTHER PUBLICATIONS

Arakadakis, "Firmware over-the-air programming techniques for IoT networks—A survey", 2021, ACM, pp. 1-21 (Year: 2021).*
Arakadakis, "Firmware over-the-air programming techniques for IoT networks—A survey", 2021, ACM, pp. 1-22 (Year: 2021).*
A Notice of Allowance in corresponding TW Application No. 111132224 mailed Feb. 17, 2024 is attached, 7 pages.
TW Office Action issued on Aug. 10, 2023, for corresponding application No. TW 111132224, 6 pages.

* cited by examiner

*Primary Examiner* — Taghi T Arani
*Assistant Examiner* — Gregory A Lane
(74) *Attorney, Agent, or Firm* — MUNCY, GEISSLER, OLDS & LOWE, P.C.

(57) ABSTRACT

An Over-the-Air (OTA) method includes controlling the current state using a control state register. The method includes recording the current state and the hash algorithm. A sorting setter obtains a random number from a server. The method includes sorting the random numbers according to a preset sorting method to obtain a sorting parameter. A hash calculator uses the sorting parameter as the input of the hash algorithm. The hash algorithm outputs a device-side hash result and transmits the device-side hash result to the server through a transmission device. After the server receives the device-side hash result, it compares the device-side hash result with the server-side hash result calculated by the server.

20 Claims, 3 Drawing Sheets

200

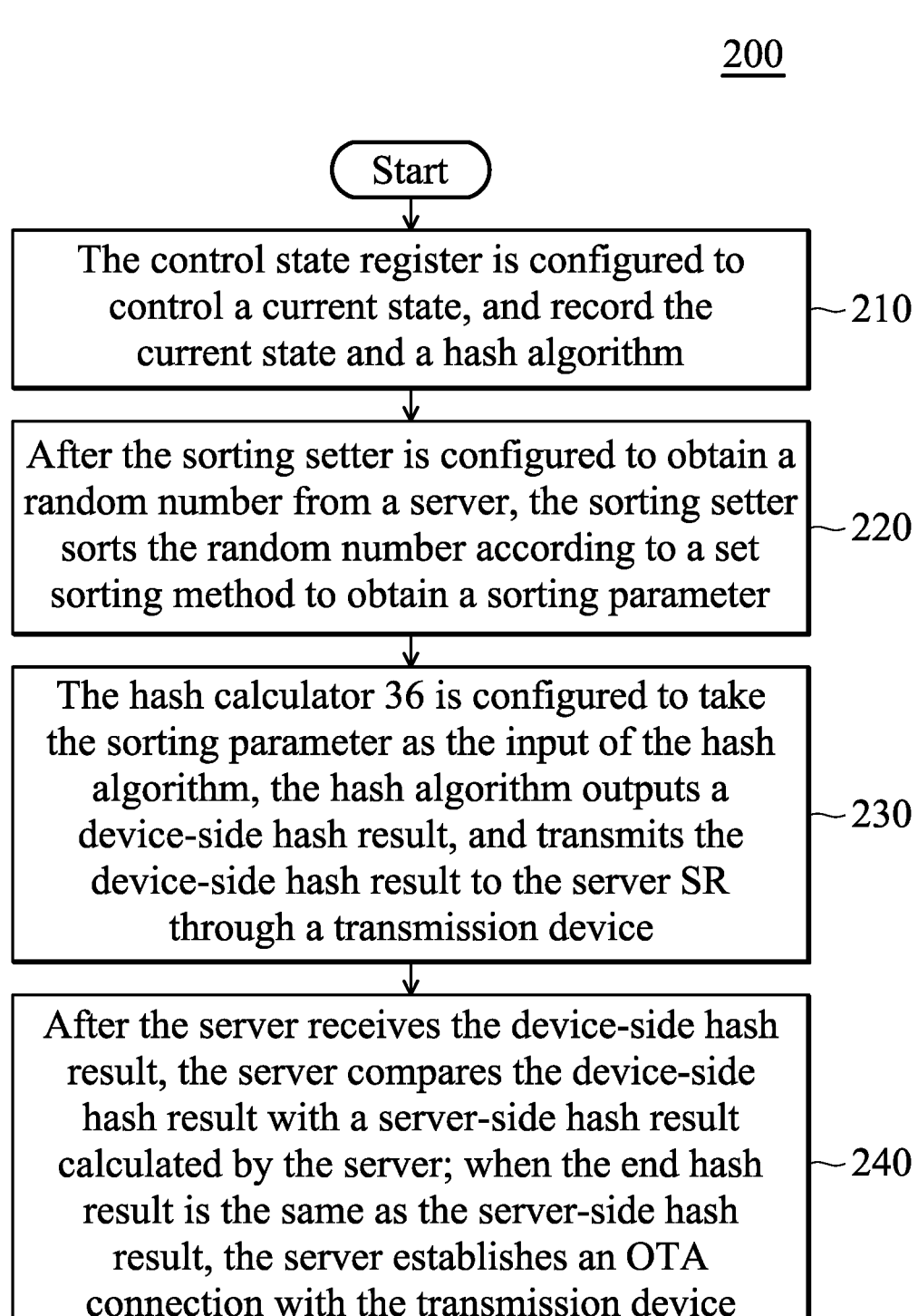

Start

The control state register is configured to control a current state, and record the current state and a hash algorithm ～210

After the sorting setter is configured to obtain a random number from a server, the sorting setter sorts the random number according to a set sorting method to obtain a sorting parameter ～220

The hash calculator 36 is configured to take the sorting parameter as the input of the hash algorithm, the hash algorithm outputs a device-side hash result, and transmits the device-side hash result to the server SR through a transmission device ～230

After the server receives the device-side hash result, the server compares the device-side hash result with a server-side hash result calculated by the server; when the end hash result is the same as the server-side hash result, the server establishes an OTA connection with the transmission device ～240

FIG. 2

OVER-THE-AIR DEVICE, OVER-THE-AIR METHOD AND OVER-THE-AIR SYSTEM

CROSS REFERENCE TO RELATED APPLICATIONS

This application claims priority of Taiwan Patent Application No. 111132224, filed on Aug. 26, 2022, the entirety of which is incorporated by reference herein.

BACKGROUND OF THE INVENTION

Field of the Invention

The present disclosure relates to a mechanism for remotely updating a device, and in particular, to an over-the-air device, an over-the-air method, and an over-the-air system.

Description of the Related Art

With the rise of IoT devices, remote updates of device software and firmware has become an indispensable part of Internet of things (IoT) devices. The purpose of these updates is not only to improve the functioning of the original device and to fix code loopholes, but they may also contain important information and algorithms.

However, if an Over-the-Air (OTA) server cannot identify whether a device that needs to be updated is legitimate (for example, whether the device is an original device sold by the manufacturer), leakage of important software and firmware information may occur, leaving the system open to malicious attacks and copyright violations of its products.

Therefore, a more secure method is required to confirm whether a desired update device is legitimate, so as to avoid leakage of important software and firmware information.

BRIEF SUMMARY OF THE INVENTION

In accordance with one feature of the present invention, the present disclosure provides an Over-the-Air (OTA) device. The OTA device includes a control state register, a sorting setter and a hash calculator. The control state register is configured to control the current state and record the current state and the hash algorithm. The sorting setter is configured to obtain a random number from a server and sort the random number according to a set sorting method to obtain a sorting parameter. Moreover, the hash calculator is configured to use the sorting parameter as input for the hash algorithm. The hash algorithm outputs a device-side hash result. The device-side hash result is sent to the server through a transmission device. After receiving the device-side hash result, the server compares the device-side hash result with the server-side hash result calculated by the server. When the device-side hash result is the same as the server-side hash result in this comparison, the server establishes an over-the-air connection with the transmission device.

In accordance with one feature of the present invention, the present disclosure provides an Over-the-Air (OTA) method. The OTA method includes the following steps. The control state register controls the current state and records the current state and the hash algorithm. The sorting setter obtains a random number from the server and sorts the random number according to a set sorting method to obtain a sorting parameter. The hash calculator uses the sorting parameter as input into the hash algorithm, the hash algorithm outputs a device-side hash result, and the hash calculator sends the device-side hash result to the server through a transmission device. After receiving the device-side hash result, the server compares the device-side hash result with the server-side hash result calculated by the server. When the device-side hash result is the same as the server-side hash result, the server establishes an over-the-air connection with the transmission device.

In accordance with one feature of the present invention, the present disclosure provides an Over-the-Air (OTA) system. The OTA system includes: a server and an over-the-air device. The over-the-air device includes a control state register, a sorting setter and a hash calculator. The control state register is configured to control the current state and record the current state and the hash algorithm. The sorting setter is configured to obtain a random number from a server and sort the random number according to a set sorting method to obtain a sorting parameter. The hash calculator is configured to use the sorting parameter as input for the hash algorithm, which outputs a device-side hash result. The device-side hash result is sent to the server through a transmission device. After receiving the device-side hash result, the server compares the device-side hash result with the server-side hash result calculated by the server. When the device-side hash result is the same as the server-side hash result, the server establishes an over-the-air connection with the transmission device. The server sorts the random number according to the set sorting method to obtain the sorting parameter, and inputs the sorting parameter into the hash algorithm, and the hash algorithm outputs the server-side hash result.

With the OTA device, OTA method and OTA system described in the invention, in the manufacturing stage, after the sorting setter is written to set the sorting method, the device becomes a readable and non-writable hardware. In other words, the sorting setter is a hardware circuit that allows a write opportunity to write data after production, and the data cannot be changed once written. In addition, the hardware circuit needs to use special software (or protocol) to complete the setting of the sorting method. Therefore, even if any information is captured by a hacker, the information in the sorting setter cannot be changed. The sorting setter is implemented through hardware, which greatly improves the security of OTA devices. With the OTA device, OTA method and OTA system described in the invention, an authentication mechanism is established between the server and the OTA device to ensure that the server confirms the legality of the OTA device before the application transmits the software or firmware information to-be updated through the OTA technology. The server then transmits the software or firmware information to-be updated to the legal OTA device through the OTA technology, so as to achieve the effect of improving the security of the OTA technology.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which:

FIG. 2 is a flowchart of an OTA method in accordance with one embodiment of the present disclosure.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
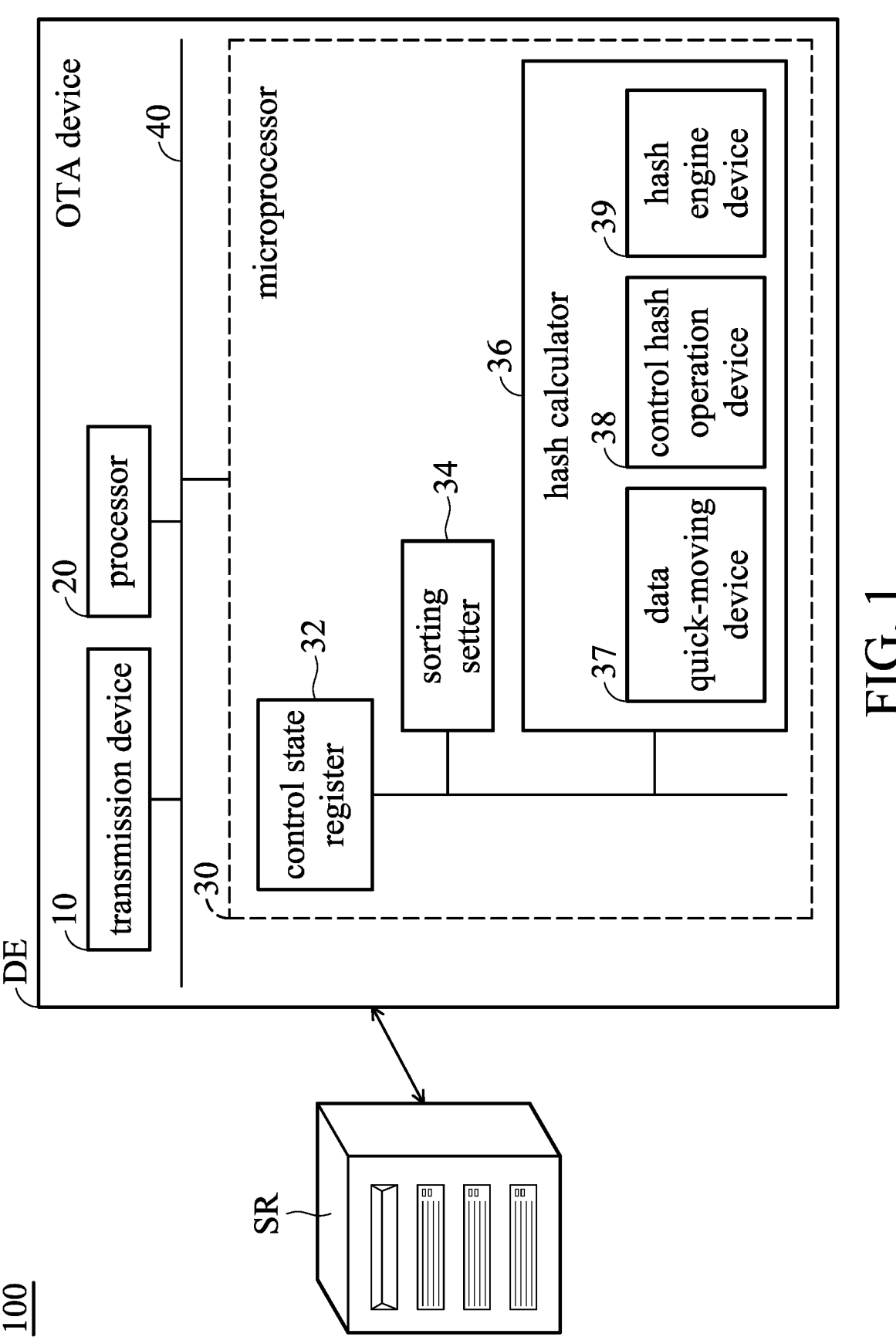
FIG. 1 is a block diagram of Over-the-Air (OTA) system in accordance with one embodiment of the present disclosure.

Refer to FIG. 1, FIG. 1 is a block diagram of Over-the-Air (OTA) system 100 in accordance with one embodiment of the present disclosure. FIG. 2 is a flowchart of an OTA method 200 in accordance with one embodiment of the present disclosure.

In FIG. 1, the OTA system 100 includes an OTA device DE. The OTA device DE may be a tablet, a mobile phone, or other network-connected devices. In some embodiments, when the OTA device DE is turned on, it will connect to the official server through the network to inform the official server that the device has been activated.

In some embodiments, the OTA device DE includes a control state register 32, a sorting setter 34 and a hash calculator 36. In one embodiment, the control state register 32, the sorting setter 34 and the hash calculator 36 are each implemented by hardware, such as a chip, a circuit, or other computable devices.

In one embodiment, the OTA device DE further includes a transmission device 10 and a processor 20. The transmission device 10 is, for example, a wired/wireless signal receiving device. In one embodiment, the transmission device 10, the processor 20 and the microprocessor 30 are each electrically coupled to a bus bar 40.

In one embodiment, the transmission device 10 is used to establish a communication link with a server SR, and the OTA device DE can receive or transmit messages to the server SR through the transmission device 10.

In one embodiment, the server SR can be a cloud device, a computer, a host, or other electronic devices with computing and storage.

In one embodiment, the processor 20 may be implemented as a microcontroller, a microprocessor, a digital signal processor, an application specific integrated circuit (ASIC), or a logic circuit.

In one embodiment, the control state register 32, the sorting setter 34, and the hash calculator 36 are included in hardware such as a chip, a circuit, or other computable device. The logic manipulation of control state register 32, sorting setter 34 and hash calculator 36 is performed by processor 20.

In one embodiment, the control state register 32, the sorting setter 34 and the hash calculator 36 are each implemented by hardware. The hardware is, for example, a chip, circuit, or other computable device, located in a microprocessor 30.

Please refer to FIG. 2, the OTA method 200 shown in FIG. 2 can be implemented by the OTA system 100 shown in FIG. 1. The OTA method 200 is used to establish an authentication mechanism between the server SR (such as an OTA server) and the OTA device DE, so as to ensure that the server SR confirms the legitimacy of the OTA device DE's identity before applying the OTA technology to transmit the software or firmware information which to-be updated. Moreover, the server SR then transmits the software or firmware information which to-be updated to the legal OTA device DE through the OTA technology.

In an embodiment, the legal definition here may refer to an OTA device DE sold by the original factory, or an OTA device DE that has been authorized to accept the application of OTA technology from the server SR to update software or hardware.

In step 210, the control state register 32 is configured to control a current state, and record the current state and a hash algorithm.

In one embodiment, the processor 20 can access the current state of the control state register 32. The current state is, for example, a random number has been received, the random number has been reordered, a hash value has been generated, etc., so that the processor 20 can instantly know the running stage of the microprocessor 30.

In one implementation, the hash algorithm, such as micro SHA128, SHA256 or other hash algorithms, has been written into the OTA device DE before the OTA device DE leaves the factory, or when the OTA device DE and the server SR perform handshake, the server SR transmits the adopted hash number algorithm to the OTA device DE.

In one embodiment, the OTA device DE stores the hash number algorithm in the hash calculator 36.

In one embodiment, the hash calculator 36 further includes a data quick-moving device 37, a control hash operation device 38 and a hash engine device 39.

In one embodiment, the data quick-moving device 37 is configured to quickly move data required by the processor 20 from the microprocessor 30 to the processor 20.

In one embodiment, the control hash operation device 38 is configured to control an execution state of the hash calculator 38. In one embodiment, the execution status is, for example, whether the hash calculation has been completed. If the process of the hash calculation is abnormal (for example, the hash operation cannot be executed correctly), the control hash operation device 38 sends an exception signal to the processor 20.

In one embodiment, the hash engine device 39 is configured to sort random numbers according to a set sorting method to obtain sorting parameters. This part will be detailed in step 220.

In one embodiment, the hash engine device 39 is a hash computing hardware accelerator.

In step 220, after the sorting setter 34 is configured to obtain a random number from a server SR, the sorting setter 34 sorts the random number according to a set sorting method to obtain a sorting parameter.

In one embodiment, the server SR may be an original server, or a server that has the right to update the software of the OTA device DE. When the server SR wants to update the software of the OTA device DE through the OTA technology, the server SR first generates a random number and transmits the random number to the transmission device 10 of the OTA device DE.

In one embodiment, the transmission device 10 of the OTA device DE transmits the received random number to the processor 10, and the processor 10 transmits the random number to the microprocessor 30.

In one embodiment, the control state register 32 in the microprocessor 30 transmits random number to the sorting setter 34.

In one embodiment, the set sorting method is as shown in Table 1.

One of the set sorting methods in Table 1 (for example, the set sorting method defined in Config. 1 in Table 1) has been written into the OTA device DE before the OTA device DE leaves the factory, or when the OTA device DE performs handshake with the server SR, the server SR transmits the adopted set sorting method (for example, the set sorting method defined in Config 1 in Table 1, that is, arranging the original random numbers in reverse) to the OTA Device DE. The OTA device DE then stores the set sorting method in the sorting setter 34.

TABLE 1

| Config 1 | Reverse the original random numbers |
|---|---|
| Config 2 | Swap the adjacent parity bits of the original random numbers (for example, swap the 1st and 2nd bits, and swap the 3rd and 4th bits) |
| Config 3 | Add the original random number(s) to the UID |
| Config 4 | Add the original random number(s) to the UCID |
| Config 5 | Add 1 to each digit of the original random number(s) |
| Config 6 | Add 2 to each digit of the original random number(s) |
| Config 7 | Add 3 to each digit of the original random number(s) |

For example, after sorting setter 34 obtains a random number (such as 2397204817) from a server SR, the sorting setter 34 sorts the random numbers according to the set sorting method defined in Config 1 (arranging the original random numbers in reverse) to obtain a sorted number parameter (e.g., 7184027932).

In one embodiment, the sorting setter 34 is hardware circuit that to allow a write opportunity to write data after production, and cannot be changed once the data is written. In addition, the hardware circuit needs to use special software (or protocol) to complete the setting of the set sorting method. Therefore, even if the hacker obtains any information, the information in the sorting setter 34 cannot be changed, and the sorting setter 34 is implemented through hardware, which greatly improves the security of the OTA device DE.

Therefore, both the server SR1 and the OTA device DE have the same set sorting method, random number and hash algorithm.

In step 230, the hash calculator 36 is configured to take the sorting parameter as the input of the hash algorithm, the hash algorithm outputs a device-side hash result, and transmits the device-side hash result to the server SR through a transmission device 10.

For example, if the sorting parameter is 7184027932, the hash calculator 36 inputs 7184027932 into the hash algorithm (for example, SHA256), the hash algorithm outputs the device-side hash result X, and the hash calculator 36 transmits the device-side hash result X to server SR through the transmission device 10.

In step 240, after the server SR receives the device-side hash result X, the server SR compares the device-side hash result X with a server-side hash result Y calculated by the server; when the end hash result X is the same as the server-side hash result X, the server SR establishes an OTA connection with the transmission device 10.

When the device-side hash result Y is the same as the server-side hash result X, it means that both the server SR and the OTA device DE have the same set sorting method, random number and hash algorithm, that is, it is verified that the OTA device DE is legal device. Therefore, the server SR establishes an OTA connection with the transmission device 10.

In one embodiment, when the device-side hash result X is different from the server-side hash result Y, the server SR does not establish an OTA connection with the transmission device 10.

In one embodiment, the server SR sorts the random numbers according to the set sorting method, that is, according to the set sorting method defined in Config 1 (arranging the original random numbers in reverse) to obtain sorting parameters, and inputs the sorting parameters into the hash algorithm (i.e., SHA256). The hash algorithm outputs the server-side hash result Y.

Figure 3:
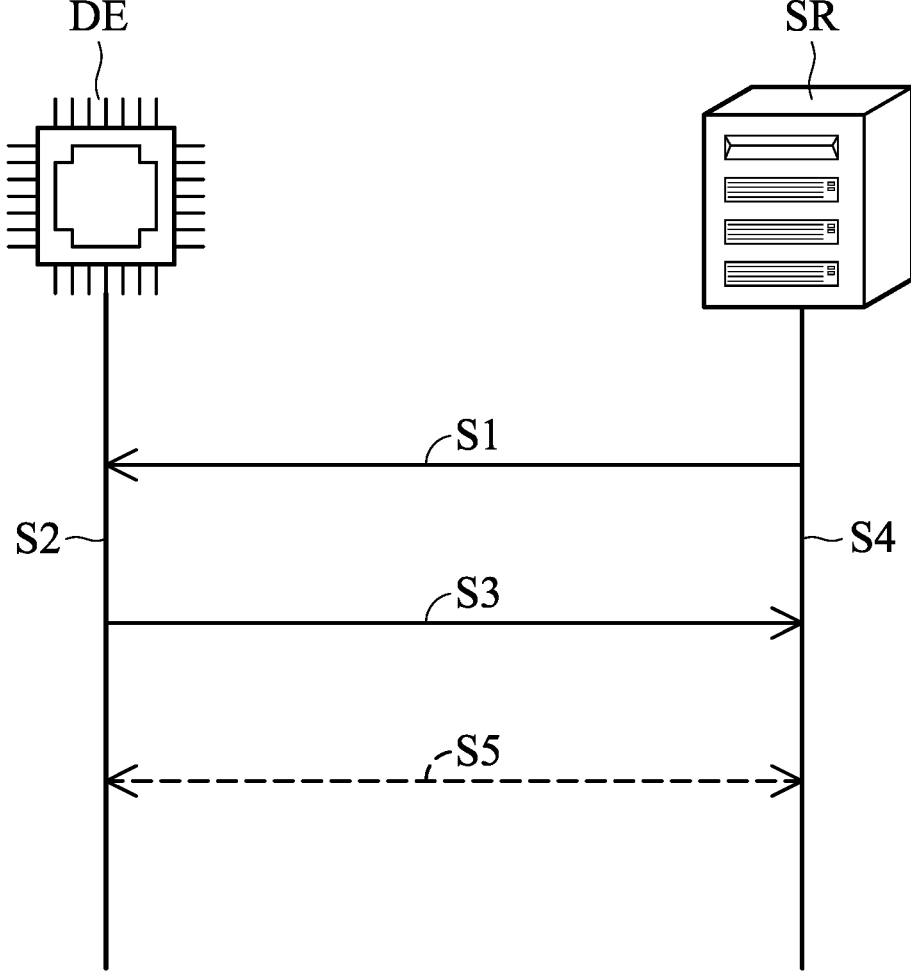
FIG. 3 is a schematic diagram of an OTA method in accordance with one embodiment of the present disclosure.

Please refer to FIG. 3, which is a schematic diagram of an OTA method in accordance with one embodiment of the present disclosure.

In one embodiment, the server SR is pre-configured with the set sorting method, random number and hash algorithm. Moreover, the OTA device DE is written into the same set sorting method and hash algorithm as the server SR before leaving the factory.

In one embodiment, when the server SR and the OTA device DE are shaking hands, the server SR transmits the set sorting method and the hash algorithm to the OTA device DE, so that the OTA device DE and the server SR have the same set sorting method and hash algorithm.

In step S1, the server SR sends a random number to the OTA device DE. In step S2, the OTA device DE sorts the random number according to the set sorting method to obtain a sorting parameter, and takes the sorting parameter as the input of the hash algorithm; and the hash algorithm outputs a device-side hash result. In step S3, the OTA device DE transmits the device-side hash result to the server SR. In step S4, the server SR sorts the random number according to the set sorting method to obtain sorting parameter, and uses the sorting parameter as the input of the hash algorithm, the hash algorithm outputs a server-side hash result, and determines whether the device-side hash result is the same as the server-side hash result. When the server SR determines that the device-side hash result is the same as the server-side hash result, the server SR proceeds to step S5 to establish an over-the-air link between the server SR and the OTA device DE. In this way, the server SR can transmit the software or firmware to-be updated to the OTA device DE by over-the-air technology.

In one embodiment, the random numbers generated by the server SR are different when each time step S1 is executed.

The above method uses random numbers and hash calculation values as the OTA device (such as product) identification code, instead of using the serial number of a single device for product identification, thereby avoiding the risk of the device serial number being counterfeited and stolen. In addition, the hash value used for identification can also be used as a key for firmware encryption and decryption. Moreover, a new random number is used for each identification to increase security.

With the OTA device, OTA method and OTA system described in the invention, in the manufacturing stage, after the sorting setter is written to set the sorting method, the device becomes a readable and non-writable hardware. In other words, the sorting setter is a hardware circuit that allows a write opportunity to write data after production, and the data cannot be changed once written. In addition, the hardware circuit needs to use special software (or protocol) to complete the setting of the sorting method. Therefore, even if any information is captured by a hacker, the information in the sorting setter cannot be changed. The sorting setter is implemented through hardware, which greatly improves the security of OTA devices. With the OTA device, OTA method and OTA system described in the invention, an authentication mechanism is established between the server and the OTA device to ensure that the server confirms the legality of the OTA device before the application transmits the software or firmware information to-be updated through the OTA technology. The server then transmits the software or firmware information to-be updated to the legal OTA device through the OTA technology, so as to achieve the effect of improving the security of the OTA technology.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An Over-the-Air (OTA) device, comprising:
a control state register, configured to control a current state and record the current state and a hash algorithm;
a sorting setter, configured to obtain a random number from a server and sort the random number according to a set sorting method to obtain a sorting parameter; and
a hash calculator, configured to use the sorting parameter as input for the hash algorithm, the hash algorithm outputs a device-side hash result, and the device-side hash result is sent to the server through a transmission device;
wherein after receiving the device-side hash result, the server compares the device-side hash result with a server-side hash result calculated by the server, and when the device-side hash result is compared with the server-side hash result; when the device-side hash result is the same as the server-side hash result, the server establishes an over-the-air connection with the transmission device.

2. The OTA device of claim 1, wherein when the device-side hash result is different from the server-side hash result, the server does not establish the over-the-air connection with the transmission device.

3. The OTA device of claim 1, wherein the control state register, the sorting setter and the hash calculator are each implemented by hardware.

4. The OTA device of claim 1, wherein control state register, the sorting setter and the hash calculator are located in hardware.

5. The OTA device of claim 4, wherein the hash calculator further comprises:
a data quick-moving device, configured to rapidly transfer data required by a processor from a microprocessor to the processor;
a control hash operation device, configured to control an execution state of the hash calculator; and
a hash engine device, configured to sort the random number according to the set sorting method to obtain the sorting parameter;
wherein the processor is configured to read the current state of the control state register.

6. The OTA device of claim 5, wherein the hash engine device is a hash computing hardware accelerator.

7. The OTA device of claim 1, wherein the server sorts the random number according to the set sorting method to obtain the sorting parameter, and inputs the sorting parameter into the hash algorithm, and the hash algorithm outputs the server-side hash result.

8. An Over-the-Air (OTA) method, comprising:
controlling a current state and recording the current state and a hash algorithm via a control state register;
obtaining a random number from a server and sorting the random number according to a set sorting method to obtain a sorting parameter via a sorting setter; and
using the sorting parameter as input for the hash algorithm via a hash calculator, so that the hash algorithm outputs a device-side hash result, and the device-side hash result is sent to the server through a transmission device;
wherein after receiving the device-side hash result, the server compares the device-side hash result with a server-side hash result calculated by the server, and when the device-side hash result is the same as the server-side hash result, the server establishes an over-the-air connection with the transmission device.

9. The OTA method of claim 8, wherein when the device-side hash result is different from the server-side hash result, the server does not establish the over-the-air connection with the transmission device.

10. The OTA method of claim 8, wherein the control state register, the sorting setter, and the hash calculator are each implemented by hardware.

11. The OTA method of claim 8, wherein the control state register, the sorting setter, and the hash calculator are located in hardware.

12. The OTA method of claim 11, wherein the hash calculator further comprises: a data quick-moving device, a control hash operation device, and a hash engine device, and the OTA method further comprises:
rapidly transferring data required by a processor from a microprocessor to the processor via the data quick-moving device;
controlling an execution state of the hash calculator via the control hash operation device; and
sorting the random number according to the set sorting method to obtain the sorting parameter via the hash engine device;
wherein the processor is configured to read the current state of the control state register.

13. The OTA method of claim 12, wherein the hash engine device is a hash computing hardware accelerator.

14. The OTA method of claim 8, further comprises:

sorting the random number according to the set sorting method to obtain the sorting parameter and inputting the sorting parameter into the hash algorithm via the server; and outputting the server-side hash result via the hash algorithm.

15. An OTA system, comprising:

a server; and an over-the-air device, comprising:

a control state register, configured to control a current state and record the current state and a hash algorithm;

a sorting setter, configured to obtain a random number from a server and sort the random number according to a set sorting method to obtain a sorting parameter; and a hash calculator, configured to use the sorting parameter as input for the hash algorithm, the hash algorithm outputs a device-side hash result, and the device-side hash result is sent to the server through a transmission device;

wherein after receiving the device-side hash result, the server compares the device-side hash result with a server-side hash result calculated by the server, and when the device-side hash result is the same as the server-side hash result, the server establishes an over-the-air connection with the transmission device;

wherein the server sorts the random number according to the set sorting method to obtain the sorting parameter, and inputs the sorting parameter into the hash algorithm, and the hash algorithm outputs the server-side hash result.

16. The OTA system of claim 15, wherein when the device-side hash result is different from the server-side hash result, the server does not establish the over-the-air connection with the transmission device.

17. The OTA system of claim 15, wherein the control state register, the sorting setter, and the hash calculator are each implemented by hardware.

18. The OTA system of claim 15, wherein the control state register, the sorting setter, and the hash calculator are located in hardware.

19. The OTA system of claim 18, wherein the hash calculator further comprises:

a data quick-moving device, configured to rapidly transfer data required by a processor from a microprocessor to the processor;

a control hash operation device, configured to control an execution state of the hash calculator; and a hash engine device, configured to sort the random number according to the set sorting method to obtain the sorting parameter;

wherein the processor is configured to read the current state of the control state register.

20. The OTA system of claim 15, wherein the hash calculator includes a hash computing hardware accelerator.

* * * * *